Figures 1, 2:
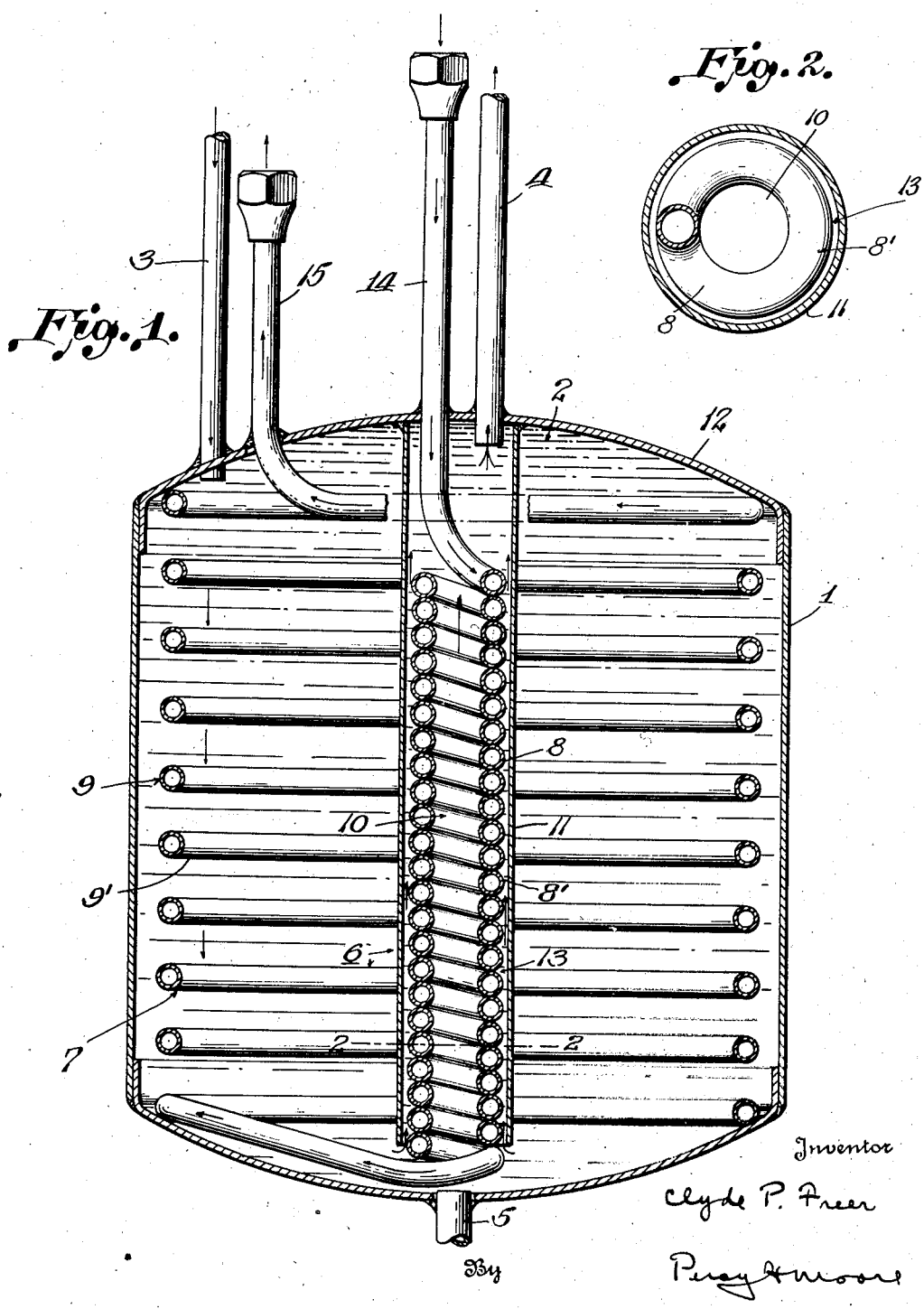

July 2, 1946.  C. P. FREER  2,403,272
WATER COOLING APPARATUS
Filed Dec. 28, 1944

Inventor
Clyde P. Freer
By Percy H. Moore
Attorney

Patented July 2, 1946

2,403,272

UNITED STATES PATENT OFFICE 2,403,272

WATER COOLING APPARATUS

Clyde P. Freer, Warren, Ohio, assignor to The Halsey W. Taylor Company, Warren, Ohio Application December 28, 1944, Serial No. 570,200

3 Claims. (Cl. 62—141)

My invention relates to an apparatus for cooling liquids.

One of the principal objects of the present invention is to provide an apparatus particularly adapted for cooling liquids in a pressure controlled drinking fountain, wherein the water outlet conduit and the refrigerant circulating conduit are so arranged and disposed as to afford a maximum of heat exchange efficiency.

Other objects and advantages of the invention will be apparent as the specification is considered with the accompanying drawing, wherein:

Figure 1 is a sectional elevation, partly broken away and partly in section, of a liquid cooling apparatus, the usual cabinet and refrigerant circulating mechanism being omitted; and Figure 2 is a section on the line 2—2 of Figure 1.

Referring more particularly to the drawing 1 denotes a tank for containing a supply of water or other liquid 2, and adapted to be mounted within a drinking fountain cabinet, not shown, such as illustrated in Patent No. 2,278,226, issued March 31, 1942, to Halsey W. Taylor of Warren, Ohio. Water to be cooled is conducted under pressure to the upper portion of the interior of the tank 1, by a pipe 3, leading from a water main, not shown. As water is drawn from time to time, from the upper portion of the tank, through a cold water outlet pipe 4, it will be automatically renewed by the pressure in the water main. A drain pipe 5 communicating with the interior of the tank, at the bottom thereof, provides means for emptying the tank.

Submerged in the tank 1 is a water cooling appliance 6 consisting of a continuous coil of pipe 7, comprising a tier 8 of inner superposed convolutions 8' and a second tier 9 of outer spaced convolutions 9' encircling the first tier, which act as the evaporator of the cooling system. The convolutions of the inner tier are closely coiled and superposed one upon the other thus providing a relatively water tight vertical passage 10, therethrough, for a purpose presently described, whereas the much larger convolutions of the outer tier extend almost to the side walls of the tank, and are spaced apart, a considerable distance from each other.

A hollow preferably tubular member or casing 11, suitably secured at its upper end to and depending from the top 12 of the tank 1, extends down over and encloses the convolutions of the inner tier, the lower end of the member 11, which may consist of a section of pipe, terminating a short distance from the tank bottom. The convolutions of both the inner and outer tiers 8 and 9 respectively are concentrically disposed with respect to each other and to the axes of the member 11 and tank 1.

Water conducted by inlet pipe 3 is discharged through the tank top 12 adjacent the side walls of the tank and the topmost convolution of outer tier 9. The water drops down in the tank over or adjacent the convolutions of outer tier 9, and enters the open lower end of the pipe or casing 11. In its passage from the lower to the upper end of the pipe 11, the stream is split into two parts, one portion of the water flowing upwardly through the narrow outer passage 13, formed between the outer sides of the convolutions of the inner tier 8 and the pipe 11, and the other portion flowing through the inner passage 10. These two portions or streams are brought into intimate and confined heat exchange relation with the inner convolutions 8' of cooling pipe 7, while the water in the body of the tank, externally of the pipe 11, is in intimate contact with the latter and with the outer convolutions 9' of the pipe 7. From the upper end of chamber or pipe 11, water is conducted through the cold water outlet pipe 4 to a valve controlled bubbler, not shown. As the precooled water from the body of the tank is progressively cooled during its upward passage through the pipe 11 the temperature of the water at the top of the pipe is lower than at any other point.

A suitable condensing unit comprising a motor, compressor and condenser, such as disclosed in the prior patent to Taylor, previously referred to, is employed for circulating a liquid refrigerant through the pipe 7. This liquid refrigerant flows from the outlet end of the condensing unit, not shown, through a pipe 14, to and downwardly through the convolutions of inner tier 8, then upwardly through the convolutions 9' of outer tier 9 and finally back to the suction side of the compressor unit, through a suction outlet pipe 15. It will of course be understood that, during its passage through the pipe 7, the refrigerant pre-cools the water in the body of the tank surrounding the outer tier of convolutions, and additionally cools the water in pipe 11, because of the evaporation of the refrigerant which is caused primarily by the heat from the water in the hollow member or pipe 11. Upon circling through the coil of pipe 7, the now vaporized refrigerant leaves the pipe 7 and tank 1 and is returned to the condensing unit where it is compressed, condensed and converted to liquid so that the cycle may be repeated.

The warm inlet water, entering the top of the tank is cooled by the refrigerant gas in the outermost section or tier of the coil 7. The pre-cooled water reaches the bottom of tank 1 and enters the open end of pipe 11, at a point adjacent to the center of the tank and at the bottom thereof, the coldest section of the tank body. Enroute through the passages 10 and 13, from the bottom of the tank to the top of pipe 11, the pre-cooled water is completely and progressively cooled by intimate contact with the convolutions 8'. The greatest efficiency and maximum cooling of the outlet water is attained by segregating the completely cooled water from the pre-cooled and confining the former within the restricted chamber afforded by the casing 11, and in which the refrigerating action of the convolutions 8' is concentrated.

Having thus described my invention what I claim is:

1. An apparatus for cooling liquid comprising a chambered body, a cooling coil providing a refrigerant circulating passage, said cooling coil comprising outer pre-cooling convolutions and inner concentric cooling convolutions submerged within said chambered body, a hollow member sleeved over said inner convolutions and providing a vertical inner chamber for the pre-cooled liquid, said inner convolutions being arranged in tightly coiled superposed relation and slightly spaced from the hollow member to separate the vertical inner chamber into out-flow passages on opposite sides of said inner convolutions, said hollow member being sealed at one end from and at its other end being in communication with the interior of said chambered body, means for conducting a supply of liquid to be cooled to said chambered body, and an outlet for the cooled liquid in communication with the upper end of said vertical inner chamber.

2. An apparatus for cooling liquid comprising a chambered body, a cooling coil providing a refrigerant circulating passage, said cooling coil comprising inner and outer tiers of convolutions submerged within said chambered body, a hollow member having its upper end secured to and closed by the top of said chambered body and at its lower end terminating adjacent to and opening into the bottom of the chambered body, the said inner tier of convolutions encased within said hollow member, the space between adjacent convolutions of the inner tier being substantially closed and the convolutions slightly spaced from the hollow member to provide outflow passages in said hollow member on opposite sides of said inner convolutions, means for supplying water to said chambered body and a cold water outlet in communication with the upper end of said hollow member.

3. An apparatus for cooling liquid comprising a chambered body, a cooling coil providing a refrigerant circulating passage, said cooling coil comprising outer pre-cooling convolutions and inner concentric cooling convolutions submerged within said chambered body, a hollow member sleeved over said inner convolutions and providing a vertical inner chamber for the pre-cooled liquid, said inner convolutions being arranged in tightly coiled superposed relation and slightly spaced from the hollow member to separate the vertical inner chamber into out-flow passages on opposite sides of said inner convolutions, said inner convolutions terminating short of the top of said inner chamber and below the uppermost convolutions of said outer convolutions to provide a space for the cooled liquid, said hollow member being sealed at one end from and at its other end being in communication with the interior of said chambered body, means for conducting a supply of liquid to be cooled to said chambered body, and an outlet for the cooled liquid in communication with the space at the upper end of said vertical inner chamber for drawing off the cooled water therefrom at its point of lowest temperature.

CLYDE P. FREER.